Patented Feb. 3, 1942

2,271,654

UNITED STATES PATENT OFFICE 2,271,654

MERINGUE MIXTURE

Verne D. Littlefield, Beverly Hills, Calif., assignor to Armour and Company, Chicago, Ill., a corporation of Illinois No Drawing. Application December 27, 1938, Serial No. 248,006

4 Claims. (Cl. 99—139)

This invention relates to meringue mixtures of the kind used in the baking and candy-making trade, and it comprises a meringue mixture composed of dried egg albumen, provided sugar, and other customary ingredients of such mixtures to which meringue mixture has been added small amounts of lactic acid, or lactates, to improve the whipping volume and stability of foams made from such mixtures in the usual way.

Ordinary meringue mixtures customarily used in the arts contain, as the essential ingredient, dried egg albumen, or dried egg whites. Other common constituents are tapioca, powdered sugar, tragacanth, or other water-soluble gum, corn starch, cream of tartar, aluminum alums, such as sodium aluminum sulfate, and like materials.

While the essential ingredient is a dried egg white material the above addition agents are used in various proportions and various combinations, to give mixtures which can be directly employed by the baker or candy-maker in the preparation of meringues, marshmallows, candy fillings, and like edible products. All of these meringue compositions are first dissolved in water and the resulting solution whipped to form a voluminous foam which is then incorporated in baked products, candies and the like.

Meringue compositions should, after solution in water, yield voluminous and stable foams. The usefulness of meringue mixtures is very largely dependent upon the characteristics of the foam which it will yield. Prior workers in the art have, for example, added edible fruit acids to dry meringue mixtures to improve the whipping characteristics of the product. What is desired is a composition which can be prepared directly from dried egg albumen to give a dry mixture which can be stored, shipped and handled without deterioration and which will always yield voluminous and stable foams having volume and stability characteristics better than those obtained from the present type of meringue compositions.

I have now discovered that the volume of foam and the stability of the foam, particularly the latter, is greatly improved when, to the dried egg albumen mixture, I add small amounts of lactic acid, or lactic acid salts. The lactate radical, I have discovered, is particularly efficacious in contributing to the formation of a large volume of stable foam.

In essence then, the present invention consists in incorporating in any of the common meringue mixtures small amounts of lactic acid substances. These lactic acid substances can be ordinary lactic acid or the common lactates, such as calcium lactate. When lactates are used it is advantageous to incorporate small amounts of an edible acid, such as tartaric acid for the purpose of liberating free lactic acid by the action of the tartaric acid with the lactate.

I have run many tests to demonstrate the peculiar efficiency of lactic acid and its superiority over other acids. These tests were carried out on compositions consisting of 30% of dried egg albumen, and 70% of powdered sugar, this basic albumen-sugar composition being used in the following way:

510 grams of granulated sugar were mixed with 53 grams of the basic mixture and this mixture was dissolved in 355 cubic centimeters of water in a Hobart 10-qt. mixer. The solution was whipped for seven minutes at high speed and the height of the foam in the bowl measured as an index of the volume. The stability of the foam was also measured by the usual test, namely measuring the amount of drip when the foam is maintained in a funnel.

To this base solution various acids were added in varying proportions and the volume of foam measured in each case.

For example, when no acid is added the volume of foam under the above standard conditions amounts to 10 centimeters. When 0.5% of lactic acid is added the volume of foam is 11.4 centimeters. The same amount of citric, malic or tartaric acid gives a volume of only 11 centimeters. When the amount of lactic acid is increased to 1% the volume of foam increases to 11.9 centimeters whereas 1% of citric, malic or tartaric acid gives a foam volume of 11.4 centimeters. When the amount of lactic acid is increased to 2% the volume of foam increases to 12.5 centimeters whereas 2% of citric, malic or tartaric acid shows no improvement in foam volume over 1%. 3% of lactic acid increases the foam volume to 14.3 centimeters but there is no improvement when the other acids mentioned are used in this proportion.

In the following table I show the effect of mixtures of calcium lactate and an acid:

| Ca lactate percent added | Acid, percent added | Height of foam, cm. |
|---|---|---|
| 3 | None | 10.0 |
| 6 | None | 11.0 |
| 2 | 1 (tartaric) | 12.1 |
| 2 | 1.5 (tartaric) | 12.8 |
| 2 | 2.0 (tartaric) | 13.1 |
| 4 | 2.0 (tartaric) | 14.1 |
| 4 | 2.0 (citric) | 13.5 |
| 2 | 2.0 (citric) | 12.9 |
| 2 | 1.0 (citric) | 11.9 |
| 2 | 1.0 (lactic) / 1.0 (citric) | 13.8 |

The above table shows that even when the percentage of calcium lactate alone (no added acid) is increased to as much as 6% the height of the foam is still less than when only ½% of lactic acid is used. This indicates the necessity for having another acid present when calcium lactate is added.

In every instance as the volume increases there is a simultaneous improvement in stability, and "body" of the resulting foam and both of these characteristics are highly desirable in meringue compositions.

I shall now indicate various formulae for meringue compositions embodying the principles of the present invention.

*Formula I*

| | Parts by weight |
|---|---|
| Dry egg albumen | 30 |
| Lactic acid | 1.5 |
| Tapioca | 40 |
| Powdered sugar | 24.5 |
| Tragacanth | 1 |
| Sodium aluminum sulfate | 1 |
| Cream of tartar | 2 |

*Formula II*

| | |
|---|---|
| Dry egg albumen | 30 |
| Corn starch | 15 |
| Powdered sugar | 49 |
| Calcium lactate | 2 |
| Tragacanth | 1 |
| Sodium aluminum sulfate | 1 |
| Tartaric acid | 2 |

*Formula III*

| | |
|---|---|
| Dry egg albumen | 35 |
| Tapioca | 20 |
| Corn starch | 10 |
| Powdered sugar | 28 |
| Lactic acid | 1 |
| Calcium lactate | 2 |
| Tragacanth | 1 |
| Sodium aluminum sulfate | 1 |
| Cream of tartar | 1 |
| Tartaric acid | 1 |

The above compositions are easily prepared by mixing the constituents in the dry state. The various examples indicate the wide latitude of the normal meringue composition constituents and I do not wish to be limited to any particular proportions of meringue addition agents, such as tapioca, corn starch and the like. As stated, the essential gist of the present invention resides in the addition to meringue compositions of small amounts of lactic acid or mixtures of lactates and an edible acid for the purpose of markedly improving foam volume and foam stability.

Consequently, in the appended claims I define my composition broadly as a meringue composition to which small amounts of lactic acid alone or mixtures of lactates and an edible acid have been added. Those skilled in the art will understand that by meringue composition I mean the usual mixtures of dried egg albumen to which has been added such addition agents as corn starch, tapioca, powdered sugar and the like.

Having thus described my invention, what I claim is:

1. A meringue composition containing a small amount of added lactic acid.

2. A meringue composition containing a small amount of an added lactic acid-yielding substance.

3. A meringue composition containing small amounts of a water-soluble lactate and an edible acid capable of liberating lactic acid from said lactate.

4. A meringue composition containing a small amount of calcium lactate and tartaric acid.

VERNE D. LITTLEFIELD.